Patented Oct. 13, 1942

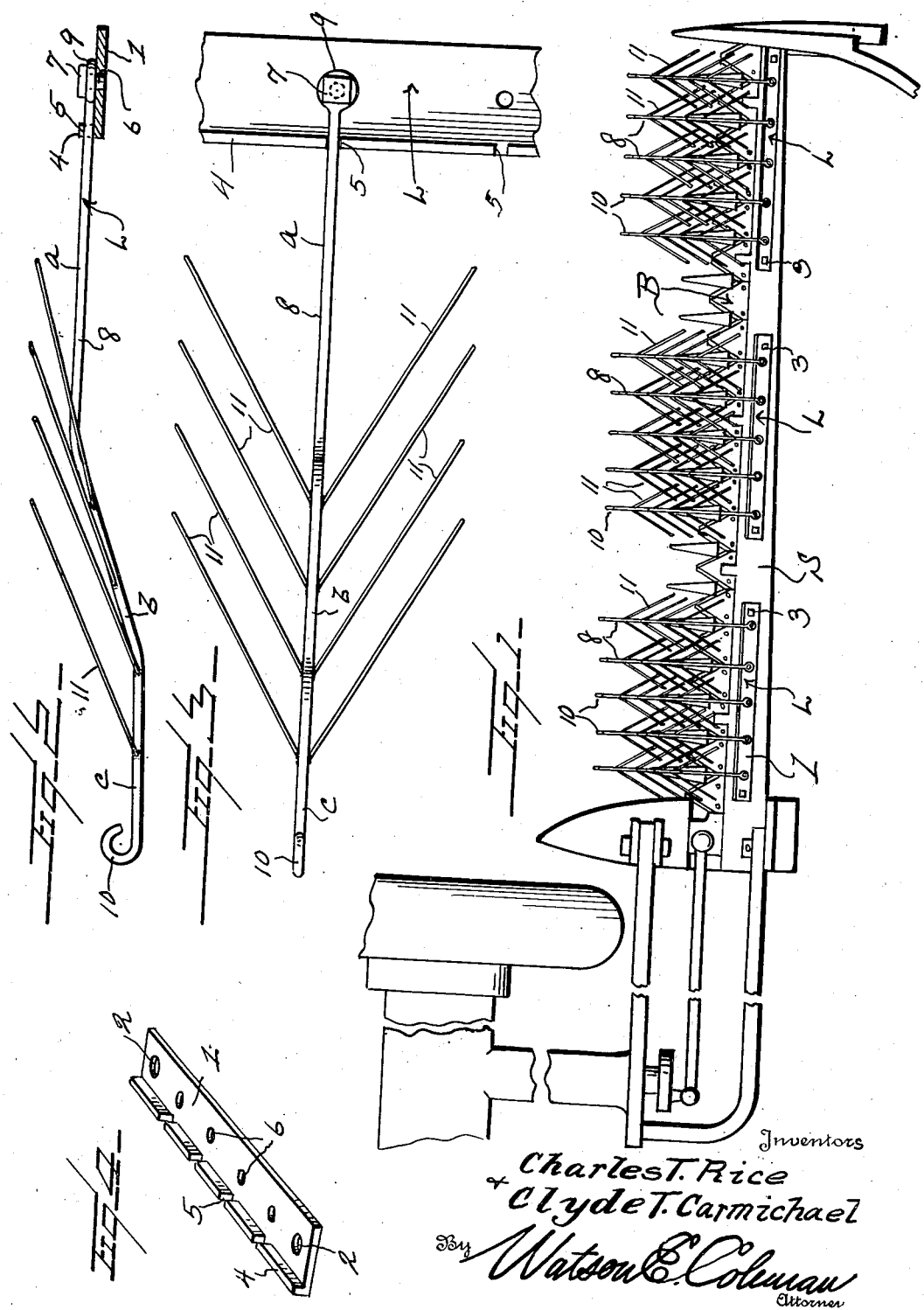

2,298,414

UNITED STATES PATENT OFFICE 2,298,414

LIFTING ATTACHMENT FOR MOWING MACHINES

Charles Thelmon Rice and Clyde Talmadge Carmichael, Albuquerque, N. Mex.

Application February 10, 1942, Serial No. 430,268

5 Claims. (Cl. 56—312)

This invention relates to a lifting attachment for mowing machines, and it is a particular object of the invention to provide an attachment or device of this kind for lifting the pods and vines of bean plants before the cutting blade of the mower reaches the stalks.

It is an object of the invention to provide an attachment or device of this kind which will enable bean farmers to harvest their crop without getting dirt mixed in the bean vines or hay, and which will hasten the natural curing process of the stalks due to the fact that the lifter will allow the stalks to be cut above the ground, leaving a majority of the large shank of the stalk and the roots in the ground.

It is also an object of the invention to provide an attachment or device of this kind which will materially quicken the threshing operation, and whereby the bean pods, which normally hang from the stalk in a vertical position, are lifted to a substantially horizontal position prior to the cutter blade of the mower reaching the stalk.

The invention consists in the details of construction and in the combination and arrangement of the several parts of my improved lifting attachment for mowing machines whereby certain important advantages are attained, as will be hereinafter more fully set forth.

In order that our invention may be the better understood, we will now proceed to describe the same with reference to the accompanying drawing, wherein:

Figure 1 is a fragmentary view in top plan illustrating lifting attachments or devices constructed in accordance with an embodiment of our invention in applied position;

Figure 2 is an enlarged detailed view, partly in section and partly in side elevation, illustrating features of an attachment or device;

Figure 3 is a fragmentary view in top plan of the structure as illustrated in Figure 2; and Figure 4 is a view in perspective of a base bar unapplied.

As disclosed in the accompanying drawing, S denotes the usual sickle bar of a mower with which coacts in a conventional manner a reciprocating sickle bar B. Mounted upon the bar S, at desired points therealong, are the improved lifting attachments or devices L.

Each of the devices L comprises a base bar 1 of desired length which is provided in its extremities with the openings 2 whereby said bar 1 may be rigidly anchored by the conventional bolts 3 or the like in desired position upon the bar S with the base bar 1 of the attachment disposed lengthwise of the bar S. The forward marginal portion of the bar 1 is provided therealong with the upstanding and longitudinally spaced flanges 4, adjacent flanges being spaced apart to provide the notches or recesses 5. The base bar 1, at points in transverse alignment with the notches or recesses 5, is provided with the openings 6 in each of which is adapted to be engaged a headed holding or anchoring member 7. In the present embodiment of our invention, this member 7 threads from above into an opening 6.

Associated with each of the base bars 1 is a plurality of elongated rods 8, said rods 8 being preferably of a number equal to the number of notches or recesses 5. It is also preferred that these notches or recesses 5 be equi-distantly spaced, as is clearly indicated in the accompanying drawing. Each of the rods 8 has a rear straight portion $a$ of desired length and which has its outer extremity formed to provide an eye-member 9 through which the shank of the holding or anchoring member 7 is directed, whereby said member 7 effectively secures the said extremity of the rod 8 to the base bar 1. This portion $a$ of the rod 8 is also snugly received within the adjacent notch or recess 5 whereby the rod is effectively maintained in desired working position.

The intermediate portion $b$ of the rod 8 is downwardly inclined on a predetermined angle with the lower or outer end of said portion $b$ continued by a front straight portion $c$. This portoin $c$ is in a plane substantially parallel to the plane of the rear portion $a$ and said portion $c$ is downwardly offset with respect to the rear portion $a$, as determined by the length and angle of the intermediate portion $b$.

The rod 8 throughout its length is of spring steel or other material possessing inherent resiliency and flexibility. This rod 8 is of sufficient strength to withstand the bean vines, rocks and clods without bending back and is preferably of a length between 12" and 14". This rod 8 is sufficiently flexible to have limited movement both up and down and from side to side, although the inherent resiliency of the rod 8 will serve to maintain the same normally in a substantially fixed position. The up and down flexibility of the rod 8 will allow the same to ride over rocks, clods, and trash, while the flexible movement from side to side will allow the rod 8 to readily maneuver around the bean stalks. It is also to be pointed out that the intermediate portion $b$ of the rod 8 is of such length and on such angle with respect to the blade B to allow the blade B to cut the bean stalk at a point about the center of the intermediate portion b.

The outer or free extremity of the forward and lower portion c of the rod 8 is turned upwardly and back to provide a rounded shoe 10 to facilitate the rod 8, or more particularly the forward portion c thereof, to ride over trash, rocks, clods, etc. It is believed to be understood that in practice this lower forward portion c of the rod 8 is closely adjacent to the ground surface and is positioned entirely in advance of the sickle blade B.

The rear extremity of the lower forward portion c of each of the rods 8, together with the intermediate portion b thereof, carry the upwardly and rearwardly inclined elongated and substantially straight fingers 11. These fingers 11 extend laterally in opposite directions from the portions c and b. These fingers 11 are preferably formed from steel wire of about $\frac{1}{32}$" in diameter and are anchored to the bar 8, or more particularly the portions c and b thereof at points therealong spaced approximately 1½". In the present embodiment of our invention the fingers 11 are welded to the rod 8 although they can be otherwise rigidly secured thereto.

As a mower machine advances it is believed to be obvious that the attachments or devices L mounted upon the bar S of the mower will engage the bean plants from below and effectively raise the vines a distance sufficient to allow the blade B of the mower to directly pass under the raised vines before cutting through the stalks. The attachments are such as to preferably lift the vines to bring the bean pods, which normally hang over a stalk in a vertical position, to a horizontal position before the cutter blade B reaches the stalk. This is important as by so doing the bean crop can be harvested without getting dirt mixed in the bean vines or hay. The improved attachments or devices as herein disclosed also assure the vine to be cut off above the ground and thus enabling the farmer to harvest and thresh his beans without dealing with dirt in the roots of the bean vines. The attachments or devices by lifting the vines to allow the bean stalks to be cut above the ground results in hastening the natural curing process of the stalks as a majority of the large shank of the bean stalk and roots will be left in the ground, and thus prolonging the life of the moisture or the sap that is in the bean stalk at the time of cutting.

It has also been found in practice that our improved attachments or devices allow a quick threshing of beans, thus assuring a higher quality of beans, one year with another, because fall rains many times damage the beans and the bean hay while they are still in the shock and before the farmers can thresh them and because of the sap that is still in the vines and roots. The quick curing process will enable the farmer to haul in the beans to a shed, barn or stack and house the beans and bean vines together before threshing, thus assuring a brighter quality of bean hay.

While we have hereinbefore stated that the fingers 11 are preferably formed of steel wire, it is to be stated that they can, if desired, be employed with equal facility if made of flat spring steel.

From the foregoing description it is thought to be obvious that a lifting attachment for mowing machines constructed in accordance with our invention is particularly well adapted for use by reason of the convenience and facility with which it may be assembled and operated.

We claim:

1. A pod lifting attachment for a mowing machine to be mounted upon the sickle bar of the machine, said attachment comprising a base bar to be connected to the sickle bar, rods secured to the base bar at points spaced lengthwise thereof, said rods extending forwardly from the base bar and having their outer end portions downwardly offset with respect to the rear portions of the bars, each of said rods being of a length to position the forward portion of the rod in advance of the sickle blade associated with the sickle bar and said forward portion of the rod being offset with respect to the inner portion of the rod sufficiently to position said forward portion of the rod below the cutting blade of the mower, and upwardly and rearwardly inclined fingers carried by each of the rods at points spaced lengthwise thereof.

2. A pod lifting attachment for a mowing machine to be mounted upon the sickle bar of the machine, said attachment comprising a base bar to be connected to the sickle bar, rods secured to the base bar at points spaced lengthwise thereof, said rods extending forwardly from the base bar and having their outer end portions downwardly offset with respect to the rear portions of the bars, each of said rods being of a length to position the forward portion of the rod in advance of the sickle blade associated with the sickle bar and said forward portion of the rod being offset with respect to the inner portion of the rod sufficiently to position said forward portion of the rod below the cutting blade of the mower, and upwardly and rearwardly inclined fingers carried by each of the rods at points spaced lengthwise thereof, said fingers extending laterally in opposite directions from each of the rods.

3. A pod lifting attachment for a mowing machine to be mounted upon the sickle bar of the machine, said attachment comprising a base bar to be connected to the sickle bar, rods secured to the base bar at points spaced lengthwise thereof, said rods extending forwardly from the base bar and having their outer end portions downwardly offset with respect to the rear portions of the bars, each of said rods being of a length to position the forward portion of the rod in advance of the sickle blade associated with the sickle bar and said forward portion of the rod being offset with respect to the inner portion of the rod sufficiently to position said forward portion of the rod below the cutting blade of the mower, and upwardly and rearwardly inclined fingers carried by each of the rods at points spaced lengthwise thereof, each of the rods being of sufficient inherent resiliency to allow the rod to flex up and down or from side to side.

4. A pod lifting attachment for a mowing machine to be mounted upon the sickle bar of the machine, said attachment comprising a base bar to be connected to the sickle bar, rods secured to the base bar at points spaced lengthwise thereof, said rods extending forwardly from the base bar and having their outer end portions downwardly offset with respect to the rear portions of the bars, each of said rods being of a length to position the forward portion of the rod in advance of the sickle blade associated with the sickle bar and said forward portion of the rod being offset with respect to the inner portion of the rod sufficiently to position said forward portion of the rod below the cutting blade of the mower, upwardly and rearwardly inclined fingers carried by each of the rods at points spaced lengthwise thereof, and an upwardly curved shoe carried by the forward extremity of each of the rods.

5. A pod lifting attachment for a mowing machine to be mounted upon the sickle bar of the machine, said attachment comprising a base bar to be connected to the sickle bar, rods secured to the base bar at points spaced lengthwise thereof, said rods extending forwardly from the base bar and having their outer end portions downwardly offset with respect to the rear portions of the bars, each of said rods being of a length to position the forward portion of the rod in advance of the sickle blade associated with the sickle bar and said forward portion of the rod being offset with respect to the inner portion of the rod sufficiently to position said forward portion of the rod below the cutting blade of the mower, upwardly and rearwardly inclined fingers carried by each of the rods at points spaced lengthwise thereof, and upstanding spaced flanges carried by the base bar, adjacent flanges being spaced apart to provide a recess to receive an inner portion of a rod.

CHARLES THELMON RICE.
CLYDE TALMADGE CARMICHAEL.